US011345124B2

(12) United States Patent
Kitada et al.

(10) Patent No.: US 11,345,124 B2
(45) Date of Patent: May 31, 2022

(54) HEAT-SHRINKABLE MULTILAYER FILM

(71) Applicant: Kureha Corporation, Tokyo (JP)

(72) Inventors: Ichiro Kitada, Tokyo (JP); Tadayoshi Itoh, Tokyo (JP); Shota Nambu, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 109 days.

(21) Appl. No.: 16/345,824

(22) PCT Filed: Jan. 16, 2018

(86) PCT No.: PCT/JP2018/000968
§ 371 (c)(1),
(2) Date: Apr. 29, 2019

(87) PCT Pub. No.: WO2018/135474
PCT Pub. Date: Jul. 26, 2018

(65) Prior Publication Data
US 2019/0375200 A1    Dec. 12, 2019

(30) Foreign Application Priority Data
Jan. 19, 2017   (JP) .............................. JP2017-007975

(51) Int. Cl.
*B32B 7/12*       (2006.01)
*B32B 27/34*      (2006.01)
*B32B 27/30*      (2006.01)
*B32B 27/36*      (2006.01)
*B32B 27/08*      (2006.01)

(52) U.S. Cl.
CPC ................ *B32B 27/08* (2013.01); *B32B 7/12* (2013.01); *B32B 27/306* (2013.01); *B32B 27/34* (2013.01); *B32B 27/36* (2013.01); *B32B 2250/05* (2013.01); *B32B 2250/24* (2013.01); *B32B 2307/736* (2013.01); *B32B 2439/46* (2013.01); *B32B 2439/70* (2013.01); *Y10T 428/31746* (2015.04)

(58) Field of Classification Search
CPC ......... B32B 27/08; B32B 27/306; B32B 7/12; B32B 27/34; B32B 2307/736; B32B 2439/70; B32B 2439/46; B32B 27/308; B32B 2307/30; B32B 7/02; B32B 27/32; B32B 27/36; B32B 2250/05; B32B 2250/24; B65D 65/40; B65D 81/24
See application file for complete search history.

(56) References Cited

U.S. PATENT DOCUMENTS

| | | | | |
|---|---|---|---|---|
| 4,557,780 A | * | 12/1985 | Newsome | B32B 27/08 156/244.11 |
| 4,732,795 A | * | 3/1988 | Ohya | B32B 27/34 428/34.9 |
| 6,699,549 B1 | | 3/2004 | Ueyama et al. | |
| 2003/0157350 A1 | * | 8/2003 | Ueyama | B29C 48/21 428/474.4 |
| 2008/0274314 A1 | | 11/2008 | Gkinosatis | |
| 2011/0027511 A1 | | 2/2011 | Kuriu et al. | |
| 2016/0152390 A1 | | 6/2016 | Itoh et al. | |
| 2018/0264787 A1 | | 9/2018 | Hausmann et al. | |

FOREIGN PATENT DOCUMENTS

| | | |
|---|---|---|
| CN | 1252348 A | 5/2000 |
| CN | 1172795 C | 10/2004 |
| EP | 0 974 452 A2 | 1/2000 |
| EP | 1 892 092 A1 | 2/2008 |
| EP | 2993041 A1 | 3/2016 |
| JP | S59152853 A | 8/1984 |
| JP | 60-189429 A | 9/1985 |
| JP | H04216050 A | 8/1992 |
| JP | H0655711 A | 3/1994 |
| JP | 11-300914 A | 11/1999 |
| JP | 2006-346868 A | 12/2006 |
| JP | 2008-50030 A | 3/2008 |
| JP | 2016-147373 A | 8/2016 |
| WO | WO 2009-123027 A1 | 10/2009 |
| WO | WO2014178378 A1 | 11/2014 |
| WO | WO2014178379 A1 | 11/2014 |
| WO | WO2016053956 A1 | 4/2016 |

OTHER PUBLICATIONS

Communication Pursuant to Article 94(3) EPC dated May 28, 2020, in European Patent Application No. 18 741 096.4.
Office Action dated Sep. 1, 2020, in Japanese Patent Application No. 2017-007975.
Office Action dated Jul. 29, 2019, in Australian Patent Application No. 2018210069.
English translation of International Preliminary Report on Patentability and Written Opinion dated Aug. 1, 2019, in PCT/JP2018/000968 (Forms PCT/IB/338, PCT/IB/373, and PCT/ISA/237).
Office Action dated Jun. 24, 2020, in Chinese Patent Application No. 201880003794.3.
Extended European Search Report dated Jan. 3, 2020, in European Patent Application No. 18741096.4.
International Search Report for PCT/JP2018/000968 dated Mar. 13, 2018.
Translation of the International Search Report for PCT/JP2018/000968 dated Mar. 13, 2018.

(Continued)

*Primary Examiner* — John D Freeman
(74) *Attorney, Agent, or Firm* — Birch, Stewart, Kolasch & Birch, LLP

(57) ABSTRACT

A heat-shrinkable multilayer film according to the present invention is obtained by laminating an inner surface layer that contacts contents, an adhesive layer, and an intermediate layer that is adjacent to the adhesive layer, in this order from an inner side to an outer side. The inner surface layer contains an ethylene-vinyl acetate copolymer, the adhesive layer contains an acid-modified ethylene-based copolymer, and the intermediate layer contains a polyamide-based resin.

4 Claims, No Drawings

(56) References Cited

OTHER PUBLICATIONS

Written Opinion of the International Searching Authority for PCT/JP2018/000968 dated Mar. 13, 2018.
Chinese Office Action and Search Report for Chinese Application No. 201880003794.3, dated Jan. 5, 2021, with English translation.
Communication Pursuant to Article 94(3) EPC dated Nov. 13, 2020, in European Patent Application No. 18 741 0096.4-1107.
Chinese Office Action (including an English translation thereof) issued in the corresponding Chinese Patent Application No. 201880003794.3 dated Jun. 18, 2021.

* cited by examiner

HEAT-SHRINKABLE MULTILAYER FILM

TECHNICAL FIELD

The present invention pertains to a heat-shrinkable multilayer film used in food product packaging.

BACKGROUND ART

Packaging materials such as heat-shrinkable multilayer bags and pouches are known to be used in food product packaging. An example of a heat-shrinkable multilayer film that is used in packaging materials is a tubular (tube-shaped) film obtained by extruding a resin laminate into a film shape from a tubular die and biaxially stretching through an inflation method. This tubular heat-shrinkable multilayer film is shaped into a bag shape or a tubular shape and manufactured into a bottom seal bag or other such packaging materials or manufactured into a side seal bag or other such packaging materials.

The bottom seal bag or other such packaging materials are, for example, manufactured as follows. First, a tubular heat-shrinkable multilayer film is subjected to primary sealing through heat sealing, impulse sealing, high frequency sealing, or the like in a direction that is perpendicular to the extrusion direction in which the material was extruded into a film shape, and a bottom seal portion of a bag is formed. Next, the film is cut in a direction that is perpendicular to the extrusion direction, at a position that differs from that of the bottom seal portion, in the extrusion direction to form an opening of the bag. In this manner, a bottom seal bag or other such packaging materials are obtained.

The side seal bag or other such packaging materials are, for example, manufactured as follows. First, a tubular heat-shrinkable multilayer film is subjected to primary sealing through heat sealing, impulse sealing, high frequency sealing, or the like in a direction that is perpendicular to the extrusion direction, and a side seal portion (bag side surface) of a bag is formed. Next, the film is cut in a direction that is parallel to the extrusion direction to form an opening of the bag. In this manner, a side seal bag or other such packaging materials are obtained.

Moreover, in a case of a flat film for which a heat-shrinkable multilayer film is extruded from a T-die and then stretched through a tenter method, the flat film is folded with a seal surface of the flat film oriented to the inside, and two flat films are stacked with the seal surfaces thereof being aligned and are primary sealed and cut in accordance with the shape of a pouch to obtain a pouch or other such packaging materials.

These heat-shrinkable packaging materials are used in food product packages. Food product packages are obtained by filling a packaging material with meat or other such contents, vacuum packaging the contents therein by implementing degassing and secondary sealing, and then heat treating to heat shrink the packaging material. Examples of heat treating include dipping a vacuum packaged product in hot water, passing the vacuum packaged product through a hot water shower, and passing the vacuum packaged product through a hot air tunnel.

As heat-shrinkable multilayer films, Patent Documents 1 and 2 for example describe, heat-shrinkable multilayer films obtained by laminating an inner surface layer that contacts the contents, an adhesive layer, a gas barrier layer adjacent to the adhesive layer, and an intermediate layer in this order from the inside to the outside, wherein the inner surface layer is made from an ethylene-based copolymer, the gas barrier layer is made from an ethylene-vinyl alcohol copolymer, and the intermediate layer is made from a polyamide-based resin.

Moreover, patent document 3 describes a heat-shrinkable multilayer film obtained by laminating an inner surface layer that contacts the contents, an adhesive layer, a layer that is adjacent to the adhesive layer and contains an ethylene-based copolymer, an adhesive layer, and a layer that contains a polyamide-based resin in this order from the inside to the outside, wherein the inner surface layer is a layer that contains an ionomer resin or polyethylene.

CITATION LIST

Patent Literature

Patent Document 1: WO 2014/178378
Patent Document 2: WO 2014/178379
Patent Document 3: WO 2016/053956

SUMMARY OF INVENTION

Technical Problem

Incidentally, when a heat-shrinkable multilayer film is shrunk using an above-described heat treatment, a load is applied to a primary seal portion, which is the portion of the packaging material that was subjected to primary sealing, and the primary seal portion could possibly tear. On account of this, there is demand for the development of a heat-shrinkable multilayer film for which the primary seal portion does not tear when the heat-shrinkable multilayer film is shrunk through heat treatment. In order that the primary seal portion does not tear, the seal strength of the primary seal portion must be high. With respect to heat-shrinkable multilayer films, the film desirably fits neatly to the contents after shrinkage, and therefore a high shrinkage rate is desirably manifested under high temperatures. However, the primary seal portion sometimes tears due to stress when the film is shrunk. Therefore, as a heat-shrinkable multilayer film for which the primary seal portion does not tear, a heat-shrinkable multilayer film having a primary seal portion with a high seal strength and having a high thermal shrinkage rate under high temperatures is in demand.

However, the inventors of the present application conducted an examination and found that the strength of the primary seal portion of the heat-shrinkable multilayer films described in patent documents 1 and 2 was insufficient. The inventors also found that the thermal shrinkage rate under high temperatures of the heat-shrinkable multilayer film described in patent document 3 was insufficient.

In light of the above-mentioned problems, an object of the present invention is to provide a heat-shrinkable multilayer film having a primary seal portion with a high seal strength and having a high thermal shrinkage rate under high temperatures.

Solution to Problem

In order to solve the above-mentioned problems, the inventors conducted diligent examinations and arrived at the present invention below.

A heat-shrinkable multilayer film according to the present invention is a heat-shrinkable multilayer film including: an inner surface layer that contacts contents; an adhesive layer; and an intermediate layer adjacent to the adhesive layer, the heat shrinkable multilayer being obtained by laminating the inner surface layer, the adhesive layer, and the intermediate layer in this order from an inner side to an outer side of the heat-shrinkable multilayer film, wherein the inner surface layer includes an ethylene-vinyl acetate copolymer (EVA); the adhesive layer includes an acid-modified ethylene-based copolymer; and the intermediate layer includes a polyamide-based resin.

Advantageous Effects of Invention

The heat-shrinkable multilayer film according to the present invention exhibits an effect of having the primary seal portion with a high seal strength and having a high thermal shrinkage rate under high temperatures.

DESCRIPTION OF EMBODIMENTS

Hereinafter, embodiments of the present invention will be described in detail.
Heat-Shrinkable Multilayer Film A heat-shrinkable multilayer film according to the present embodiment is a heat-shrinkable multilayer film containing: an inner surface layer that contacts contents; an adhesive layer; and an intermediate layer adjacent to the adhesive layer, the heat-shrinkable multilayer film being obtained by laminating the inner surface layer, the adhesive layer, and the intermediate layer in this order from an inner side to an outer side of the heat-shrinkable multilayer film, wherein the inner surface layer includes an ethylene-vinyl acetate copolymer (EVA); the adhesive layer includes an acid-modified ethylene-based copolymer; and the intermediate layer includes a polyamide-based resin.

Examples of the heat-shrinkable multilayer film according to the present embodiment include, described in order from a layer (outermost layer) configuring an outer surface to a layer (inner surface layer) that contacts meat or other such contents, for example, a heat-shrinkable multilayer film of a layered configuration including polyethylene terephthalate (PET)/a maleic anhydride-modified ethylene-based copolymer/nylon/an ethylene-vinyl alcohol copolymer (EVOH)/nylon/a maleic anhydride-modified ethylene-based copolymer/an ethylene-vinyl acetate copolymer (EVA), respectively in each layer; a heat-shrinkable multilayer film of a layered configuration including PET/a maleic anhydride-modified ethylene-based copolymer/nylon/EVOH/nylon/a maleic anhydride-modified ethylene-vinyl acetate copolymer/EVA, respectively in each layer; and heat-shrinkable multilayer films of layered configurations including PET/a maleic anhydride-modified ethylene copolymer/EVOH/nylon/a maleic anhydride-modified ethylene-based copolymer/EVA and PET/a maleic anhydride-modified ethylene-based copolymer/nylon/EVOH/nylon/a maleic anhydride-modified ethylene-based copolymer/ionomer (10)/EVA, respectively in each layer.

Moreover, a component besides resin may also be contained in the layers configuring the heat-shrinkable multilayer film. Various types of additives can be added as components besides resin, and examples include lubricants, antifogging agents, antioxidants, UV absorbers, light stabilizers, antistatic agents, anti-blocking agents, dyes, and pigments.

The thickness of the heat-shrinkable multilayer film differs depending on the type of film, but the thickness is ordinarily from 5 μm to 300 μm and is preferably from 20 μm to 150 μm. The thickness of each layer is preferably from 0.1 μm to 200 μm and more preferably from 0.5 μm to 100 μm. Furthermore, a total thickness of the inner surface layer and the adhesive layer is preferably less than 60% of the thickness of the heat-shrinkable multilayer film. Therefore, the heat-shrinkable multilayer film excels in machinability and further excels in the primary seal strength. Each of the layers configuring the heat-shrinkable multilayer film according to the present embodiment is described in detail below.
Inner Surface Layer The inner surface layer included in the heat-shrinkable multilayer film according to the present embodiment is a layer that contacts the contents.

The inner surface layer includes an ethylene-vinyl acetate copolymer (EVA), which is a copolymer having a structural unit derived from ethylene and a structural unit derived from vinyl acetate (hereinafter, referred to as a vinyl acetate monomer unit). Therefore, the heat-shrinkable multilayer film excels in self-weldability.

The content of EVA in the inner surface layer is preferably from 50 wt % to 100 wt % and more preferably from 70 wt % to 100 wt %.

Moreover, the inner surface layer may be formed by mixing with the above-mentioned EVA, a master batch containing a lubricating material, an anti-blocking agent, an antifogging agent, or the like in a resin that uses polyethylene or an ethylene-based copolymer as a base. At this time, the weight of the master batch that is to be mixed is preferably 20 wt % or less of the total weight of the resin for forming the inner surface layer.

The content of the vinyl acetate monomer unit in the EVA is preferably from 10 wt % to 20 wt %, more preferably from 12 wt % to 20 wt %, and even more preferably from 15 wt % to 20 wt %. By setting the content of the vinyl acetate monomer unit to 10 wt % or greater, the thermal shrinkage rate is further increased, and the material can be easily extruded when manufacturing the heat-shrinkable multilayer film. By setting the content of the vinyl acetate monomer unit to not more than 20 wt %, the seal strength of the primary seal portion is further increased.
Adhesive Layer The adhesive layer is a layer for adhering each of the layers to each other.

In the present embodiment, the adhesive layer includes an acid-modified ethylene-based copolymer, for example, an ethylene-based copolymer modified by an unsaturated carboxylic acid or derivative thereof, and the adhesive layer is adhered to at least the intermediate layer. Furthermore, at the intermediate layer, the adhesive layer is adhered to the inner surface layer for a case in which the inner surface layer is adjacent to a surface opposite to the surface contacting the adhesive layer, and the adhesive layer is adhered to an internal layer for a case in which the internal layer is adjacent. In this manner, the adhesive layer containing an acid-modified ethylene-based copolymer is adhered to the intermediate layer and to the internal layer or inner surface layer, and thus the interlayer adhesive strength is strengthened, and the primary seal strength can be increased.

Here, the ethylene-based copolymer that serves as the source to be modified means a polymer that contains a repeating unit derived from ethylene and at least one additional monomer. Examples of the additional monomer include α-olefin and monomers having a polar functional group. Examples of this ethylene-based copolymer include ethylene-α-olefin copolymers, EVA, and combinations of these.

Examples of ethylene-α-olefin copolymers include resins produced by a Ziegler-Natta type catalytic reaction; and resins produced by metallocene or a single site catalytic reaction.

As the acid used in modification, unsaturated carboxylic acids and derivatives thereof are preferable.

As the abovementioned unsaturated carboxylic acids, maleic acid, acrylic acid, fumaric acid, tetrahydrophthalic acid, itaconic acid, crotonic acid, isocrotonic acid, nadic acid, and the like are preferable, and examples of derivatives thereof include acid halides, amides, imides, anhydrides, and esters; and more specifically, malenyl chloride, maleimide, maleic anhydride, citraconic anhydride, monomethyl maleate, dimethyl maleate, glycidyl maleate, and the like can be used.

Of the above-described ethylene-based copolymers and the above-described unsaturated carboxylic acids, the adhesive layer is preferably a combination of an ethylene-α-olefin copolymer and maleic anhydride; and a combination of an ethylene-vinyl acetate copolymer and maleic anhydride. Namely, the adhesive layer preferably contains at least one of a maleic anhydride-modified ethylene-α-olefin copolymer or a maleic anhydride-modified ethylene-vinyl acetate copolymer.

The weight of the acid that is used in modification is preferably from 0.01 to 15 wt % and more preferably from 0.1 to 10 wt % with respect to the total weight of the modified ethylene-based copolymer that is ultimately obtained.

The adhesive layer may also further contain other olefin homopolymer and/or copolymer besides the acid-modified ethylene-based copolymer. From the perspective of interlayer adhesive strength, the content of the other olefin homopolymer and/or copolymer is preferably from 0.01 wt % to 15 wt % and more preferably from 0.1 wt % to 10 wt % of the total weight of resin configuring the adhesive layer.

Furthermore, the adhesive layer may further contain a tackiness imparting component such as a tackifier. This tackifier is used primarily for the purpose of increasing the interlayer adhesive strength after stretching and/or after shrinkage.

As the tackifier used, rosin esters, hydrogenated rosin esters, polymerized rosin esters, and other such rosins; α-pinene polymers, β-pinene polymers, diterpene polymers, and other such polyterpene-based resins; olefin-based polymers, cyclopentadiene resin, and other such aliphatic hydrocarbons and alicyclic hydrocarbon resins are preferable, and rosin ester, hydrogenated rosin ester, and alicyclic hydrocarbon resins are more preferable.

Note that an optional number of adhesive layers can be provided in addition to the above-described adhesive layer that is adjacent to the intermediate layer, and for example, an adhesive layer can be further provided between a below-described outermost layer and outer layer.

The thickness of each adhesive layer is preferably from 0.5 μm to 6.0 μm, more preferably from 0.8 μm to 5.0 μm, and even more preferably from 1.0 μm to 4.0 μm.

Intermediate Layer

The intermediate layer is a layer that is adjacent to the adhesive layer and is disposed between a barrier layer; and the inner surface layer and adhesive layer. The intermediate layer may be a single layer structure or a multilayer structure.

The intermediate layer may contain a polyamide-based resin and preferably contains, of the polyamide-based resins, an aliphatic polyamide and/or an amorphous aromatic polyamide.

Moreover, if the polyamide-based resin is a mixture of an aliphatic polyamide and an amorphous aromatic polyamide, preferably, the content of the aliphatic polyamide in the polyamide-based resin is from 60 wt % to 100 wt %, and the content of the amorphous aromatic polyamide is from wt % to 40 wt %. In addition, from the perspective of an excellent balance between stretchability and rigidity of the heat-shrinkable multilayer film, more preferably, the content of the aliphatic polyamide is from 60 wt % to 95 wt %, and the content of the amorphous aromatic polyamide is from 5 wt % to 40 wt %; and even more preferably, the content of the aliphatic polyamide is from 70 wt % to 90 wt %, and the content of the amorphous aromatic polyamide is from 10 wt % to 30 wt %.

As the aliphatic polyamides, those having a melting point of from 180° C. to 270° C. are preferably used, and examples include nylon 6 (melting point: approximately 220° C.), nylon 66 (melting point: approximately 260° C.), nylon 6-66 (melting point: from 180° C. to 210° C.), nylon 6-12 (melting point: from approximately 135° C. to 190° C.), nylon 6-10 (melting point: from approximately 220° C. to 230° C.), and nylon 6-66-12 (melting point: from approximately 180° C. to 190° C.). That is, the polyamide-based resin contained in the intermediate layer preferably includes at least one selected from the group consisting of nylon 6, nylon 6-66, nylon 6-12, and nylon 6-66-12. By configuring the intermediate layer to contain a polyamide-based resin that includes these, the heat-shrinkable multilayer film that includes the intermediate layer can be easily extruded.

As the amorphous aromatic polyamide, a polycondensate with an aliphatic diamine, having isophthalic acid and terephthalic acid as main acid components, is used. As the acid components, a mixture containing from 40 mol % to 98 mol % of an isophthalic acid component and from 2 mol % to 60 mol % of a terephthalic acid component is preferred. Particularly, from the perspective of versatility, an amorphous nylon commonly known as nylon 6I-6T (Ny6I-6T), in which the aliphatic diamine contains hexamethylene alone, is preferred.

In a case where a mixture of an aliphatic polyamide and an amorphous aromatic polyamide is used, of these, a mixture of nylon 6-66 and nylon 6I-6T is preferable from the perspectives of biaxial stretchability and the heat shrinkability of the stretched film.

The content of the polyamide-based resin in the intermediate layer is preferably from 60 wt % to 100 wt %, more preferably from 80 wt % to 100 wt %, and even more preferably 100 wt %. That is, in addition to the polyamide-based resin, the intermediate layer may also contain, for example, an ethylene-vinyl alcohol copolymer, an ionomer, and a polyamide/polyether block copolymer or other such resin, but from the perspectives of extrusion stability and transparency of the film after stretching, the intermediate layer is preferably configured from only a polyamide-based resin.

Moreover, of the polyamide-based resin contained in the intermediate layer, the content of amorphous aromatic polyamide in particular is preferably from 5 wt % to 40 wt %. By setting the content of the amorphous aromatic polyamide to not less than 5 wt % an excellent stretchable film-forming property is provided, and by setting the content thereof to not more than 40 wt %, the rigidity of the heat-shrinkable multilayer film can be suitably increased.

The thickness of the intermediate layer with respect to the total film thickness of the heat-shrinkable multilayer film according to the present embodiment is preferably greater than 15% and not more than 50%, more preferably from 20% to 45%, and even more preferably from 25% to 40%. By setting the thickness thereof to greater than 15%, the heat-shrinkable multilayer film excels in stretchability, and by setting the thickness thereof to not more than 50%, the heat-shrinkable multilayer film excels in flexibility. More specifically, the thickness of the intermediate layer is preferably from 1 μm to 50 μm, more preferably from 1.5 μm to 40 μm, and even more preferably from 2 μm to 30 μm.

Note that if necessary, up to 20 wt % a thermoplastic resin other than a polyamide-based resin, such as an olefin-based resin modified with an acid such as maleic acid or anhydride thereof, an ethylene-acrylic acid copolymer (EAA), an ethylene-methacrylic acid copolymer (EMMA), an ionomer resin (TO), and a saponified ethylene-vinyl acetate copolymer, may be contained in the intermediate layer.

Internal Layer

The heat-shrinkable multilayer film according to the present embodiment contains the above-described inner surface layer, adhesive layer, and intermediate layer as essential constituent layers, but as necessary, the heat-shrinkable multilayer film may further contain, between the inner surface layer and the adhesive layer, an internal layer that is adjacent to both the inner surface layer and the adhesive layer.

Examples of materials of the internal layer include low-density polyethylene (LDPE), very-low-density linear polyethylene (VLDPE), linear low-density polyethylene (LLDPE), ethylene-propylene copolymer (PP-Et), ethylene-vinyl acetate copolymer (EVA), ethylene-acrylic acid copolymer (EAA), ethylene-methacrylic acid copolymer (EMMA), ethylene-methyl acrylate copolymer (EMA), ethylene-ethyl acrylate copolymer (EEA), ethylene-butyl acrylate copolymer (EBA) and ionomers (IO); and the internal layer preferably includes at least one of LDPE, VLDPE, LLDPE, EAA, EVA and TO, more preferably includes at least one of LDPE, VLDPE, LLDPE, EAA and EVA, and even more preferably includes at least one of LDPE, VLDPE, LLDPE and EVA. By configuring the internal layer to contain an above-described resin, a heat-shrinkable multilayer film having a high primary seal strength and a high thermal shrinkage rate similar to a case in which the inner surface layer and adhesive layer are adjacent can be obtained, and the water vapor barrier property can be improved.

The content of the LDPE, VLDPE, LLDPE or EVA in the internal layer is preferably from 60 wt % to 100 wt %, more preferably from 70 wt % to 100 wt %, and even more preferably 100 wt %. That is, the internal layer may be composed of only LDPE, VLDPE, LLDPE, or EAA, but for a case in which the heat-shrinkable multilayer film is colored, for example, a master batch containing pigment in a base polymer may be mixed with a resin such as LDPE, VLDPE, LLDPE, EAA, or the like to form the internal layer. In this case, the weight of the master batch that is to be mixed is preferably 30 wt % or less of the total weight of the resin for forming the internal layer.

The thickness of the internal layer is preferably from 0 μm to 50 μm, more preferably from 0 μm to 45 μm, and even more preferably from 0 μm to 40 μm.

Barrier Layer

The heat-shrinkable multilayer film according to the present embodiment may include, adjacent to an outer side of the intermediate layer, a barrier layer having a function of gas barrier property.

In the present embodiment, the layer configuration of the heat-shrinkable multilayer film is, in order from the outside to the inside, the barrier layer/intermediate layer/adhesive layer/inner surface layer or internal layer. In this manner, with the heat-shrinkable multilayer film according to the present embodiment, the intermediate layer and not the barrier layer is laminated directly on top of the adhesive layer. Here, the intermediate layer is more firmly adhered to the adhesive layer than the barrier layer. Therefore, the heat-shrinkable multilayer film according to the present embodiment has a higher interlayer adhesive strength and a higher primary seal strength than a heat-shrinkable multilayer film that has a layer configuration of, in order from the outside to the inside, intermediate layer/barrier layer/adhesive layer/inner surface layer or internal layer.

In the present embodiment, the barrier layer may be a single layer structure or may be a multilayer structure, and for example, a barrier layer that can prevent particularly degradation, due to permeated oxygen, of meat products such as raw meat and processed meats that are the contents of a package can be suitably used.

Examples of materials that can be contained in the barrier layer include ethylene-vinyl alcohol copolymer (EVOH), polyvinylidene chloride-based resin (PVDC) and polymetaxylylene adipamide (nylon MXD6); and EVOH and nylon MXD6 are more preferable from the perspective of excelling in heat resistance by laminating with an adjacent polyamide-based resin, and EVOH is even more preferable from the perspectives of excelling in stretchability and the stretched heat-shrinkable multilayer film being flexible and easy to handle.

As the EVOH, the content of the vinyl alcohol monomer unit is preferably from 27 mol % to 48 mol %, more preferably from 32 mol % to 48 mol %, and even more preferably from 38 mol % to 48 mol %. A heat-shrinkable multilayer film that is flexible and excels in heat-shrinkability can be obtained by setting the content of the vinyl alcohol monomer unit to the above-described preferable range.

The content of the EVOH or nylon MXD6 in the barrier layer is preferably from 60 wt % to 100 wt %, more preferably from 70 wt % to 100 wt %, and even more preferably from 80 wt % to 100 wt %. That is, in addition to the above-described resins, the barrier layer may contain, for example, a resin such as a polyamide resin and a polyolefin, but from the perspective of barrier performance, the barrier layer is preferably configured with 80 wt % or more of EVOH or nylon MXD6.

The thickness of the barrier layer is, for example, preferably from 1 μm to 20 μm, more preferably from 3 μm to 15 μm, and even more preferably from 4 μm to 10 μm. When the thickness is within the above-described preferable range, the barrier layer is of a sufficient thickness. Therefore, the barrier performance required by the heat-shrinkable multilayer film can be maintained even after being stretched and then stored in high humidity conditions.

For cases in which the barrier layer contains EVOH, there is a concern that the barrier performance could decrease in high humidity conditions because EVOH has a high affinity with water. Here, the humidity of contents such as meat packaged by the heat-shrinkable multilayer film is significantly high in the film. Therefore, the humidity of the package becomes high particularly for a case in which the heat-shrinkable multilayer film (package) with contents packaged is immersed in water and stored in a shrunk state. As a result, there is a concern that the barrier performance of the heat-shrinkable multilayer film could decrease. With regard to this, the barrier performance of the heat-shrinkable multilayer film can be maintained by setting the thickness of the barrier layer to the above-described preferable range.

Moreover, for a case in which the barrier layer contains nylon MXD6, the barrier performance in low humidity conditions is lower than that of EVOH, but the barrier performance of the heat-shrinkable multilayer film can be maintained by setting the thickness of the barrier layer to the above-described preferable range.

Outer Layer

The heat-shrinkable multilayer film according to the present embodiment may include an outer layer adjacent to an outer side of the barrier layer.

The resin constituting the outer layer is not particularly limited and, for example, can contain the same polyamide-based resin as that of the above-described intermediate layer. In this case, a multilayer film having a strong interlayer adhesive strength can be configured by further providing, on the outer side of the outer layer, an adhesive layer containing the same resin as that of the above-described adhesive layer.

The content of the polyamide-based resin in the outer layer is preferably from 60 wt % to 100 wt %, more preferably from 80 wt % to 100 wt %, and even more preferably 100 wt %. That is, in addition to the polyamide-based resin, the outer layer may also contain, for example, an ethylene-vinyl alcohol copolymer, an ionomer, and a polyamide/polyether block copolymer or other such resin, but from the perspective of extrusion stability and transparency of the film after stretching, the intermediate layer is preferably configured from only a polyamide-based resin.

The thickness of the outer layer is preferably from 1 μm to 50 μm, more preferably from 1.5 μm to 40 μm, and even more preferably from 2 μm to 30 μm.

Outermost Layer

The heat-shrinkable multilayer film according to the present embodiment may include an outermost layer adjacent to an outer side of the outer layer.

The resin contained in the outermost layer is not particularly limited, and examples include heat resistant thermoplastic resins. Therefore, a heat-shrinkable multilayer film excelling in surface glossiness, suitability for printing or suitability for affixing labels, and suitability for high-speed sealing can be obtained.

Examples of the heat resistant thermoplastic resin contained in the outermost layer include aliphatic polyester resins, aromatic polyester resins, aliphatic polyamide resins, and aromatic polyamide resins. Aliphatic polyester resins and aromatic polyester resins are preferable, and aromatic polyester resins are more preferable.

Examples of aromatic polyester resins include polyethylene terephthalate (PET), polyethylene terephthalate-isophthalate copolymers (copolymerized PET), polylactic acid (PLA), and polyhydroxybutyric acid (PHB). PET and copolymerized PET are preferable, and from the perspective of melt co-extrusion processability, copolymerized PET is more preferable.

Here, the outermost layer may further contain, besides the above-mentioned aromatic polyester resin, a lubricant and/or antistatic agent. The lubricant may be in either a liquid form or a solid form.

Examples of the lubricant include liquid paraffin, natural paraffin, polyethylene wax, microcrystalline wax, and other hydrocarbon-based lubricants; stearic acid, lauric acid, and other fatty acid-based lubricants; stearic acid amide, palmitic acid amide, N-oleyl palmitic acid amide, behenic acid amide, erucic acid amide, arachidic acid amide, oleic acid amide, escinic acid amide, methylene bis-stearoamide, ethylene bis-stearoamide, and other aliphatic amide-based lubricants; butyl stearate, hydrogenated castor oil, ethylene glycol monostearate, stearic acid monoglyceride, and other ester-based lubricants; zinc stearate, calcium stearate, and other metal soaps derived from fatty acids having from 12 to 30 carbon atoms; and silica, zeolite, and other inorganic lubricants, and of these, one type may be used alone, or two or more types may be used. Of these lubricants, fatty acid amide-based lubricants and metal soaps are preferable. Note that the lubricant is, for example, contained in the outermost layer as a lubricant master batch (copolymerized PET containing silica) in the form of being mixed with the above-described aromatic polyester resin. In this case, from the perspectives of slipperiness and transparency of the film, the content of the lubricant master batch is, with respect to the total weight of resin constituting the outermost layer, preferably from 3 wt % to 30 wt %, more preferably from 5 wt % to 25 wt %, and even more preferably from 10 wt % to 20 wt %. Here, the resin that serves as the base for the lubricant master batch is the same as the resin contained in the outermost layer, and therefore the content of the silica contained in the outermost layer is, with respect to the total weight of resin constituting the outermost layer, preferably from 0.05 wt % to 3 wt %, more preferably from 0.1 wt % to 2 wt %, and even more preferably from 0.2 wt % to 1 wt %. The content of the erucic acid amide in the outermost layer is, with respect to the total weight of resin constituting the outermost layer, preferably from 0.02 wt % to 3 wt %, more preferably from 0.05 wt % to 2 wt %, and even more preferably from 0.1 wt % to 1 wt %.

Examples of the antistatic agent include anionic surfactants, cationic surfactants, nonionic surfactants, and amphoteric surfactants. Of these antistatic agents, one type may be used alone, or two or more types may be used. The content of the antistatic agent is, with respect to the total weight of resin constituting the outermost layer, preferably from 0.01 wt % to 3 wt %, more preferably from 0.05 wt % to 2 wt %, and even more preferably from 0.1 wt % to 1 wt %.

The thickness of the outermost layer is preferably from 0.5 μm to 10 μm, more preferably from 1 μm to 8 μm, and even more preferably from 1.5 μm to 5

Heat-Shrinkable Multilayer Film

As described above, the heat-shrinkable multilayer film according to the present embodiment is configured with: an inner surface layer, which is a layer that contains EVA and contacts the contents; an adhesive layer containing an acid-modified ethylene-based copolymer; and an intermediate layer that contains a polyamide-based resin, laminated in this order, and the interlayer adhesive strength is increased by allowing the adhesive layer and the intermediate layer to be adjacent. Therefore, the seal strength of the primary seal portion is high, and the thermal shrinkage rate under high temperatures is increased. Therefore, when the heat-shrinkable multilayer film is shrunk, a load is not applied to the primary seal portion, which is the portion of the packaging material that was subjected to primary sealing, and the primary seal portion does not easily tear.

Note that primary sealing referred to here means sealing one end of a heat-shrinkable multilayer film that is in a state of not being heat-fused. Moreover, the primary seal portion means a portion that has been subjected to primary sealing. An example of a method for sealing one end of the heat-shrinkable multilayer film is a method of heat fusing a portion at which the heat-shrinkable multilayer film is overlapped, using heat sealing, impulse sealing, or the like.

Examples of packaging materials that are obtained by subjecting the above-described heat-shrinkable multilayer film to primary sealing include bottom seal bags and side seal bags.

A bottom seal bag is obtained by extruding a resin laminate into a film shape from a tubular die, biaxially stretching the film through an inflation method to obtain a tubular heat-shrinkable multilayer film, folding the tubular heat-shrinkable multilayer film, forming a bottom seal portion of a bag by subjecting the tubular heat-shrinkable multilayer film to primary sealing through heat sealing or impulse sealing in a direction perpendicular to the extrusion direction in which the resin laminate was extruded into a film shape, and cutting the film in a direction perpendicular to the extrusion direction at a position that differs in the extrusion direction from the bottom seal portion to form an opening of the bag.

A side seal bag is obtained by subjecting the above-described tubular heat-shrinkable multilayer film to primary sealing through heat sealing, impulse sealing, or the like in a direction that is perpendicular to the extrusion direction to form a side seal portion (bag side surface) of a bag; and then cutting the film in a direction that is parallel to the extrusion direction to form an opening of the bag.

In the present embodiment, the seal strength (adhesive strength) of a primary seal portion that does not easily tear means excelling in a seal strength at a low temperature, a seal strength at 23° C., and a seal strength at 90° C.

Here, the extent to which the seal strength at a low temperature excels can be ascertained, for example, by performing a drop ball test on the seal portion at 5° C. The drop ball test is a test to confirm whether the primary seal portion of a bottom seal bag tears under the weight of raw meat when the user of the bottom seal bag vigorously drops 5 kg of raw meat into the bottom seal bag to fill the bag with the raw meat, in a location with a temperature of around 5° C.

Procedures (1) to (6) of the drop ball test performed on a seal portion at a temperature of 5° C. are described in greater detail below.

(1) First, ten bottom seal bags for testing that were prepared from a heat-shrinkable multilayer film before shrinking are stored for 24 hours in a 5° C. refrigeration chamber.

(2) Next, the opening of each bottom seal bag is oriented upward in the 5° C. refrigeration chamber, and the bottom seal bag is suspended and fixed so that a center part of the primary seal portion is positioned at a height of 30 cm from the floor of the refrigeration chamber.

(3) Next, a bowling ball weighing 5.5 kg is dropped naturally onto the primary seal portion from a height of 100 cm from the floor of the refrigeration chamber (70 cm from the center part of the primary seal portion).

(4) If the primary seal portion is torn, the bag is evaluated as "seal tearing is present". If the primary seal portion is not torn, the bowling ball is dropped again onto the primary seal portion. If the primary seal is not torn even after the dropping of the ball has been repeated five times, the bag is evaluated as "no seal tearing".

(5) Once "seal tearing is present" or "no seal tearing" has been determined, dropping of the bowling ball into the bottom seal bag is stopped, the bag is replaced with another bottom seal bag, and the procedures (2) to (4) are implemented. In this manner, the procedures (2) to (4) are performed on each of the ten bottom seal bags for testing.

(6) If the number of seal tears (number of torn bags) is three or fewer out of the ten bags, the heat-shrinkable multilayer film before shrinkage can be determined to excel in the seal strength at a low temperature. If the number of seal tears is two or fewer, the film further excels in the seal strength at a low temperature, and if the number of seal tears is one or fewer, the film excels even further in the seal strength at a low temperature.

Moreover, with regard to the seal strength of the primary seal portion at 23° C. and at 90° C., a sample prepared by using a vacuum packaging machine (Multivac AGW) to subject the film to primary sealing through impulse sealing is left for 2 hours or longer at ordinary temperature, after which the primary seal portion of the sample can be measured at each temperature using a known tensile tester.

Note that the primary seal strength at 23° C. is preferably 22 N/15 mm or greater, more preferably 24 N/15 mm or greater, and even more preferably 26 N/15 mm or greater. Moreover, the primary seal strength at 90° C. is preferably 1.7 N/15 mm or greater, more preferably 1.8 N/15 mm or greater, and even more preferably 1.9 N/15 mm or greater.

A higher primary seal strength is preferable, but in a case where the primary seal strength is too high, there is a possibility that the inner surface layer (base material) of the heat-shrinkable multilayer film could tear, and thus a primary seal strength at which the base material tears can be considered to be the upper limit of the primary seal strength. Here, the upper limit of the primary seal strength at which the heat-shrinkable multilayer film tears can substantially approximate the tensile strength of each heat-shrinkable multilayer film. Moreover, even if the layer configuration is the same, the upper limit of the primary seal strength increases as the thickness of the heat-shrinkable multilayer film increases. For example, in a case where the tensile strength of a 40 μm heat-shrinkable multilayer film is 85 N/15 mm, the upper limit of the primary seal strength of the heat-shrinkable multilayer film can be considered to be 85 N/15 mm. Furthermore, in a case where the thickness of the heat-shrinkable multilayer film is increased from 40 μm to 70 μm, the upper limit of the primary seal strength of the film becomes higher than 85 N/15 mm.

The interlayer adhesive strength here means particularly the adhesive strength between the adhesive layer and the intermediate layer at 23° C. The interlayer adhesive strength is preferably 1 N/15 mm or greater, more preferably 2 N/15 mm or greater, and even more preferably 3 N/15 mm or greater. The seal strength of the primary seal portion can be further increased by setting the interlayer adhesive strength to the above-described preferable range.

The interlayer adhesive strength can, for example, be determined by cutting a sample having a width of 15 mm and a length of 100 mm from the heat-shrinkable multilayer film, leaving 85 mm from one end in the length direction of the sample, and delaminating between the inner surface layer and the intermediate layer up to 15 mm from the other end to prepare a test piece having a "chuck allowance" with a length of 15 mm at an end of one layer. The "chuck allowance" of the test piece is then fixed in a known tensile tester, the inner surface layer and intermediate layer are pulled apart so that the remaining 85 mm of the test piece is delaminated at a constant tensile test speed, and the strength necessary for delamination is measured to thus determine the interlayer adhesive strength.

Here, with the heat-shrinkable multilayer film according to the present embodiment, the resins contained in the inner surface layer and the adhesive layer are similar, and the inner surface layer and the adhesive layer are strongly adhered to each other. Therefore, even for a case in which the inner surface layer and the intermediate layer are pulled apart, delamination between these layers does not occur. On the other hand, the adhesive strength between the adhesive layer and the intermediate layer is weaker than the adhesive strength between the inner surface layer and the adhesive layer, and therefore there is a possibility that delamination could occur between the adhesive layer and the intermediate layer. Therefore, with respect to the heat-shrinkable multilayer film according to the present embodiment, the interlayer adhesive strength is considered to be the adhesive strength between the adhesive layer and the intermediate layer, and the adhesive strength can be measured to ascertain whether the laminate from the inner surface layer to the intermediate layer of the heat-shrinkable multilayer film according to the present embodiment will not easily delaminate.

Note that as described above, the adhesive strength between the adhesive layer and the intermediate layer is lower than the adhesive strength between the inner surface layer and the adhesive layer, but even so, for a case in which the adhesive layer and the intermediate layer are firmly adhered such that the two layers do not delaminate, for example, for a case in which the adhesive strength between the adhesive layer and the intermediate layer is greater than 4 N/15 mm, the inner surface layer tears before the adhesive layer and the intermediate layer delaminate, and "base material tearing" may occur. In other words, for a case in which the inner surface layer and the intermediate layer are delaminated at the condition described above, if base material tearing has occurred, the adhesive strength between the adhesive layer and the intermediate layer is measured to be greater than 4 N/15 mm.

The thermal shrinkage rate at high temperatures indicates the thermal shrinkage rate in the machine direction (MD) direction and the thermal shrinkage rate in the transverse direction (TD) of the heat-shrinkable multilayer film at 80° C. The MD thermal shrinkage rate and the TD thermal shrinkage rate are respectively, preferably from 28% to 50%, more preferably from 30% to 45%, and even more preferably from 32% to 40%.

The MD thermal shrinkage rate and the TD thermal shrinkage rate at 80° C. can each be determined by, for example, immersing in 80° C. hot water for 10 seconds a heat-shrinkable multilayer film that has been cut to 100 mm (MD)×100 mm (TD), then removing the film, cooling the film in water at ordinary temperature, and determining the MD and TD thermal shrinkage rates from the MD length and TD length as measured with a ruler after cooling, the MD length and TD length before immersion, and the equation of: thermal shrinkage rate (%)=(100−length after immersion)/ 100×100.

Moreover, the heat-shrinkable multilayer film according to the present embodiment also excels in self-weldability. In the present embodiment, the matter of excelling in self-weldability refers to, for example, that the adhesive strength (self-weldability) of the inner surface layer itself at an excess portion (ear) of the packaging material of a sample is from 1 N/15 mm to 20 N/15 mm when a pouch (bag) is prepared by subjecting the heat-shrinkable multilayer film to primary sealing through impulse sealing or the like, then the pouch is filled with contents to obtain a package, the package is immersed in 80° C. hot water for approximately 3 seconds to heat shrink the film, then immediately cooled in cold water to obtain a sample, and then the sample is left in a room at an ambient temperature of 23° C. and an ambient humidity of 50% RH for one day or longer. The adhesive strength can be measured using a known tensile tester.

If the heat-shrinkable multilayer film according to the present embodiment includes at least three layers including the inner surface layer that contacts the contents, the adhesive layer, and the intermediate layer that is adjacent to the adhesive layer, the film can be used as a packaging material for which the primary seal portion does not easily tear, but the heat-shrinkable multilayer film may further include, between the inner surface layer and the adhesive layer, an internal layer that is adjacent to both the inner surface layer and the adhesive layer. Furthermore, as necessary, the heat-shrinkable multilayer film may include a barrier layer, an outer layer that abuts the outer side of the barrier layer, an outermost layer located at the outermost side of the heat-shrinkable multilayer film, and an adhesive layer for adhering various other layers besides between the inner surface layer and the intermediate layer.

Contents

The contents are the items packaged in the heat-shrinkable multilayer film according to the present embodiment. In the present embodiment, contents include, for example, edible meat such as meat from livestock, and more specific examples include meats such as beef, pork, lamb, and poultry (for example, chicken, turkey and duck).

The shape of each edible meat is not limited, and examples include, in the case of beef, pork or lamb, cuts (pieces of meat weighing from 5 kg to 15 kg and cut from a dressed carcass), blocks (pieces of meat weighing less than 5 kg and cut from a dressed carcass), slices, and ground meat; and in the case of poultry, examples include a whole bird (with the head, feathers, and internal organs removed), blocks, slices, and ground meat.

Method of Producing the Heat-Shrinkable Multilayer Film

The heat-shrinkable multilayer film according to the present embodiment is manufactured by respectively melting and extruding resins for forming various layers using a plurality of extruders, then introducing the melted resins into an annular die or the like, co-extruding, and then stretching using a known method.

The temperature when melting and extruding is not particularly limited as long as the temperature is at or above the temperature at which the resins contained in each layer melt and less than the temperature at which thermal decomposition occurs, and any optional temperature can be used.

For example, in the case of EVA for forming the inner surface layer, the temperature is preferably from 100° C. to 220° C. and is more preferably from 110° C. to 210° C. In the case of the resin for forming the internal layer, the temperature is preferably from 100° C. to 220° C. and is more preferably from 110° C. to 210° C. In the case of the resin for forming the adhesive layer, the temperature is preferably from 100° C. to 220° C. and is more preferably from 110° C. to 210° C. In the case of the resin for forming the intermediate layer, the temperature is preferably from 140° C. to 260° C. and is more preferably from 150° C. to 250° C. In the case of the resin for forming the barrier layer, the temperature is preferably from 130° C. to 280° C. and is more preferably from 140° C. to 270° C. In the case of the resin for forming the outer layer, the temperature is preferably from 140° C. to 260° C. and is more preferably from 150° C. to 250° C. In the case of the resin for forming the outermost layer, the temperature is preferably from 230° C. to 280° C. and is more preferably from 240° C. to 270° C.

The temperature for co-extruding with the annular die is preferably from 230° C. to 280° C. and is more preferably from 235° C. to 270° C.

Next, the molten tubular body that is co-extruded and flows out from the outlet of the annular die is pressed with a pinch roller while being cooled in a water bath and is formed into a film-shaped tubular body. The cooling temperature may be any temperature at or below the melting point of the resins constituting each layer and, for example, is preferably from 5° C. to 30° C. and more preferably from 10° C. to 25° C.

Moreover, after being cooled in the water bath, the film-shaped tubular body may be subjected to radiation exposure using a known method before or after stretching. Through this type of aspect, the resins contained in each layer are crosslinked, and thus characteristics such as stretchability, heat resistance, and mechanical strength can be further improved as compared to an aspect without radiation exposure.

As the radiation, α-rays, β-rays, an electron beam, γ-rays, X-rays, and other known radiation can be used, but from the perspective of the crosslinking effect before and after exposure, electron beams and γ-rays are preferable, and of these, electron beams are more preferable by virtue of the high level of workability and production capacity when producing the heat-shrinkable multilayer film. The irradiation conditions for radiation may be set, as appropriate, according to the targeted application. As an example, in the case of electron beams, an acceleration voltage in a range from 150 kiloelectron volts to 500 kiloelectron volts (hereinafter, described as "keV") and an irradiation dose in a range of from 10 kilogray to 200 kilogray (hereinafter, described as "kGy") are preferable, and in the case of γ-rays, a dosage rate in a range of from 0.05 to 3 kGy/hour is preferred.

Moreover, after the post-cooled film-shaped tubular body or post-electron beam irradiated film-shaped tubular body has been heated, it is stretched while cooling.

The heating is performed, for example, by a method such as passing through hot water, after which the film-shaped tubular body is stretched and formed into a bubble shape. From the perspective of stretchability, the re-heating temperature is preferably from 85° C. to 89° C. and more preferably from 85° C. to 87° C.

The tubular body film that has been stretched through heating is stopped at a predetermined size and is cooled to stabilize an inflation bubble. The cooling temperature is preferably from 5° C. to 30° C. and more preferably from 10° C. to 25° C.

As the method for stretching in the stretching step, an inflation method in which the tubular body is drawn out in the perpendicular direction while a fluid is fed into the tubular body is used. Manufacturing is preferably carried out through uniaxial stretching or biaxial stretching.

The thermal shrinkage rate of the heat-shrinkable multilayer film can be set to the above-described preferable range by appropriately performing uniaxial or biaxial stretching. Furthermore, when biaxially stretching is performed, ordinarily the molecules become oriented, and therefore, from the perspectives of transparency, barrier performance, and strength, biaxially stretching is more preferable.

The stretching ratio is not particularly limited, but the stretching ratio in the machine direction (MD) is preferably from 2.5 times to 4.0 times and more preferably from 2.7 times to 3.8 times. Moreover, the stretching ratio in the transverse direction (TD) is preferably from 2.6 times to 3.8 times and more preferably from 2.8 times to 3.6 times.

Next, the obtained stretched tubular body film is guided into a pipe for heat treating and is heated to a temperature of from 60° C. to 90° C. by vapor blown out from a blowout port of the heat treatment pipe. Through this, the film is relaxed at from 3% to 25% in the MD and from 3% to 25% in the TD. By performing this heat treatment for 1 to 10 seconds, a heat-shrinkable multilayer film of a bubble-shaped tubular body can be manufactured.

SUMMARY

The heat-shrinkable multilayer film according to the present invention is a heat-shrinkable multilayer film including: an inner surface layer that contacts contents; an adhesive layer; and an intermediate layer adjacent to the adhesive layer, the heat-shrinkable multilayer film being obtained by laminating the inner surface layer, the adhesive layer, and the intermediate layer in this order from an inner side to an outer side of the heat-shrinkable multilayer film, wherein the inner surface layer includes an ethylene-vinyl acetate copolymer (EVA); the adhesive layer includes an acid-modified ethylene-based copolymer; and the intermediate layer includes a polyamide-based resin.

Moreover, the inner surface layer and the adhesive layer are preferably adjacent in the heat-shrinkable multilayer film according to the present invention.

In addition, the heat-shrinkable multilayer film according to the present invention may further include, between the inner surface layer and the adhesive layer, an internal layer that is adjacent to both the inner surface layer and the adhesive layer. The internal layer preferably contains at least one selected from the group consisting of low density polyethylenes (LDPE), very low density linear polyethylenes (VLDPE), linear low density polyethylenes (LLDPE), ethylene-acrylic acid copolymers (EAA), ethylene-methyl acrylate copolymers (EMA), ethylene-ethyl acrylate copolymers (EEA), ethylene-vinyl acetate copolymers (EVA), and ionomers (TO).

In addition, the polyamide-based resin contained in the intermediate layer of the heat-shrinkable multilayer film according to the present invention preferably contains at least one of an aliphatic polyamide or an amorphous aromatic polyamide.

Moreover, the polyamide-based resin contained in the intermediate layer of the heat-shrinkable multilayer film according to the present invention preferably includes at least one selected from the group consisting of nylon 6, nylon 6-66, nylon 6-12, nylon 6-10, and nylon 6-66-12.

Moreover, the adhesive layer of the heat-shrinkable multilayer film according to the present invention preferably contains an ethylene-based copolymer modified by an unsaturated carboxylic acid or derivatives thereof.

Moreover, the adhesive layer of the heat-shrinkable multilayer film according to the present invention preferably contains a maleic anhydride-modified ethylene-based copolymer.

Furthermore, the adhesive layer of the heat-shrinkable multilayer film according to the present invention preferably contains at least one of a maleic anhydride-modified ethylene-α-olefin copolymer or a maleic anhydride-modified ethylene-vinyl acetate copolymer.

Furthermore, the content of a vinyl acetate monomer unit in the ethylene-vinyl acetate copolymer (EVA) of the heat-shrinkable multilayer film according to the present invention is preferably from 10 wt % to 20 wt %.

Moreover, preferably, the heat-shrinkable multilayer film according to the present invention further contains a barrier layer adjacent to an outer side of the intermediate layer, and the barrier layer contains at least one selected from the group consisting of ethylene-vinyl alcohol copolymers (EVOH) and polymetaxylylene adipamide (nylon MXD6).

In addition, preferably, the heat-shrinkable multilayer film according to the present invention further includes an outer layer adjacent to an outer side of the barrier layer, and the outer layer includes a polyamide-based resin.

In addition, the polyamide-based resin contained in the outer layer of the heat-shrinkable multilayer film according to the present invention preferably contains at least one of an aliphatic polyamide or an amorphous aromatic polyamide.

Moreover, the polyamide-based resin contained in the outer layer of the heat-shrinkable multilayer film according to the present invention preferably includes at least one selected from the group consisting of nylon 6, nylon 6-66, nylon 6-12, nylon 6-10, and nylon 6-66-12.

Embodiments of the present invention will be described in further detail hereinafter using examples. The present invention is of course not limited to the examples below, and it goes without saying that various aspects are possible with regard to the details thereof. In addition, the present invention is not limited to the embodiments described above, and various modifications can be made within the scope indicated by the claims. Embodiments obtained by appropriately combining the technical means disclosed are also included in the technical scope of the present invention. In addition, all of the documents disclosed in the present specification are herein incorporated by reference.

EXAMPLES

The resin materials for each of the layers of the heat-shrinkable multilayer films used in the Examples and Comparative Examples are presented below.

(1) Copolymerized PET

A resin obtained by mixing BELLPET IFG-8L (copolymerized polyethylene terephthalate) available from Bell Polyester Products, Inc. and MB60 (lubricant master batch) available from Nippon Pigment Co., Ltd. at a weight ratio of 88:12 was used as a copolymerized PET (polyethylene terephthalate) in the outermost layer of the Examples and Comparative Examples.

(2) Ny

A resin obtained by mixing UBE Nylon 5034B (nylon 6-66) available from Ube Industries, Ltd. and Selar PA3426 (nylon 6I-6T) available from DuPont at a weight ratio of 85:15 was used as the nylon (Ny) in the outer layer and intermediate layer of the Examples and Comparative Examples.

(3) EVOH

Eval G156B available from Kuraray Co., Ltd. was used as the EVOH in the barrier layer of the Examples and Comparative Examples.

(4) Mod-PE

Admer SF730 available from Mitsui Chemicals, Inc. was used as the acid-modified ethylene-α olefin copolymer (Mod-PE) in the adhesive layer of the Examples and Comparative Examples.

(5) Mod-EVA

Bynel 3861 available from DuPont was used as the acid-modified ethylene-vinyl acetate copolymer (Mod-EVA) in the adhesive layer of the Examples and Comparative Examples.

(6) EVA+Tackifier (10 wt %)

A resin obtained by mixing Ultrasen 635 (EVA) available from Tosoh Corporation and Ester Gum HP (tackifier), a hydrogenated rosin ester available from Arakawa Chemical Industries, Ltd., at a weight ratio of 90:10, was used as an EVA+tackifier (10 wt %) in the adhesive layer of the Comparative Examples.

(7) EVA+Tackifier (30 wt %)

A resin obtained by mixing Ultrasen 635 (EVA) available from Tosoh Corporation and Ester Gum HP (tackifier), a hydrogenated rosin ester available from Arakawa Chemical Industries, Ltd., at a weight ratio of 70:30, was used as an EVA+tackifier (30 wt %) in the adhesive layer of the Comparative Examples.

(8) EVA

Elvax 3165 from DuPont with a content of a vinyl acetate monomer unit in EVA of 18 wt % was used in the inner surface layer of the Examples and Comparative Examples.

(9) VLDPE

A resin obtained by mixing ATTANE 4607GC (VLDPE) available from The Dow Chemical Company and SUMIKATHENE A-26 (anti-blocking agent master batch) available from Sumitomo Chemical Co., Ltd. at a weight ratio of 90:10 was used as a VLDPE in the inner surface layer of the Comparative Examples.

(10) IO

SURYN 1707 available from DuPont was used as an ionomer resin (TO) in the inner surface layer of the Comparative Examples.

Example 1

In Example 1, a heat-shrinkable multilayer film having a layer configuration including for each respective layer, in order from the outside to the inside, at a thickness (units: μm) indicated in parenthesis, copolymerized PET (2)/MOD-PE (1.5)/Ny (7)/EVOH (4)/Ny (7)/Mod-PE (1.5)/EVA (17) was produced through the following method.

Each resin was respectively melt-extruded by a plurality of extruders. The melt-extruded resins were introduced into an annular die, melted and bonded so as to form the above-described layer configuration, and co-extruded. A melted tubular body discharged from an outlet of the annular die was pressed with a pinch roller while being rapidly cooled to approximately 20° C. in a water bath to form a film-shaped tubular body. Next, the obtained film-shaped tubular body was passed through a hot water bath at 87° C. to form a bubble-shaped tubular body film, and the film was then biaxially stretched with stretching ratios of 3.0 times in the machine direction (MD) and 3.1 times in the transverse direction (TD) simultaneously by the inflation method while being cooled by airing at a temperature of from 20° C. to 25° C. Next, the stretched tubular body film was guided into a pipe for heat treating having a pipe length of approximately 2 m, and a bubble-shaped tubular body film in heat treatment was obtained. Moreover, this tubular body film was heated to 70° C. by vapor blown out from a blowout port and was heat treated for 2 seconds while being relaxed at 6% in the machine direction and 6% in the transverse direction. Thus, a heat-shrinkable multilayer film with a tubular body was obtained.

Example 2

In Example 2, a heat-shrinkable multilayer film was obtained in the same manner as Example 1 with the exception that as the adhesive layer, Mod-EVA was used in place of the Mod-PE.

Example 3

In Example 3, a heat-shrinkable multilayer film was obtained in the same manner as Example 2 with the exception that the thickness of the EVA of the inner surface layer was changed from 17 μm to 37 μm, and the thicknesses of the intermediate layer containing Ny and outer layer containing Ny were respectively changed from 7 μm to 12 μm.

Example 4

In Example 4, a heat-shrinkable multilayer film was obtained in the same manner as Example 1 with the exception that instead of providing an outer layer containing Ny, the thickness of the intermediate layer containing Ny was changed from 7 μm to 14 μm.

Comparative Example 1

In Comparative Example 1, a heat-shrinkable multilayer film was obtained in the same manner as Example 1 with the exception that instead of providing an intermediate layer containing Ny, the thickness of the outer layer containing Ny was changed from 7 μm to 14 μm.

Comparative Example 2

In Comparative Example 2, a heat-shrinkable multilayer film was obtained in the same manner as Comparative Example 1 with the exception that as the adhesive layer, Mod-EVA was used in place of the Mod-PE.

Comparative Example 3

In Comparative Example 3, a heat-shrinkable multilayer film was obtained in the same manner as Example 1 with the exception that as the adhesive layer, EVA+a tackifier (10 wt %) was used in place of the Mod-PE.

Comparative Example 4

In Comparative Example 4, a heat-shrinkable multilayer film was obtained in the same manner as Example 1 with the exception that as the adhesive layer adjacent to the inner surface layer, EVA+a tackifier (30 wt %) was used in place of the Mod-PE.

Comparative Example 5

In Comparative Example 5, a heat-shrinkable multilayer film was obtained in the same manner as Example 1 with the exception that as the inner surface layer, VLDPE was used in place of EVA.

Comparative Example 6

In Comparative Example 6, a heat-shrinkable multilayer film was obtained in the same manner as Comparative Example 5 with the exception that instead of providing an intermediate layer containing Ny, the thickness of the outer layer containing Ny was changed from 7 μm to 14 μm.

Comparative Example 7

In Comparative Example 7, a heat-shrinkable multilayer film was obtained in the same manner as Comparative Example 6 with the exception that as the inner surface layer, 10 was used in place of the VLDPE.

Various Properties of the Heat-Shrinkable Multilayer Film

Hereinafter, the various properties of the heat-shrinkable multilayer films produced in Examples 1 to 4 and Comparative Examples 1 to 7 were measured.

Seal Strength of Primary Seal Portion

The seal strength at a lower temperature (5° C. drop ball test) was measured by performing a drop ball test on the seal portion at 5° C. The drop ball test is a test to confirm whether the primary seal portion of a bottom seal bag tears under the weight of raw meat when the user of the bottom seal bag vigorously drops 5 kg of raw meat into the bottom seal bag to fill the bag with the raw meat in a location with a temperature of around 5° C.

The drop ball test was performed on the seal portion at a temperature of 5° C. based on the following procedures (1) to (6).

(1) First, ten bottom seal bags for testing that were prepared from each of the heat-shrinkable multilayer films before shrinking of Examples 1 to 4 and Comparative Examples 1 to 7 were stored for 24 hours in a 5° C. refrigeration chamber.

(2) Next, the opening of each bottom seal bag was oriented upward in the 5° C. refrigeration chamber, and the bottom seal bag was suspended and fixed so that a center part of the primary seal portion was positioned at a height of 30 cm from the floor of the refrigeration chamber.

(3) Next, a bowling ball weighing 5.5 kg was dropped naturally onto the primary seal portion from a height of 100 cm from the floor of the refrigeration chamber (70 cm from the center part of the primary seal portion).

(4) If the primary seal portion tore, the bag was evaluated as "seal tearing is present". If the primary seal portion did not tear, the bowling ball was dropped again onto the primary seal portion. If the primary seal did not tear even after the dropping of the ball was repeated five times, the bag was evaluated as "no seal tearing".

(5) Once "seal tearing is present" or "no seal tearing" was determined, dropping of the bowling ball into the bottom seal bag was stopped, the bag was replaced with another bottom seal bag, and the procedures (2) to (4) were implemented. In this manner, the procedures (2) to (4) were performed on each of the ten bottom seal bags for testing.

(6) The number of seal tears (number of torn bags) among the ten bags was measured. The results are shown in Table 1.

The seal strengths at 23° C. and at 90° C. were measured in the following manner. Samples were prepared by using a vacuum packaging machine (Multivac AGW) to primary seal the prepared heat-shrinkable multilayer films through impulse sealing with a sealing time of 2 seconds, a sealing pressure of 1 kg/cm', a seal bar width of 1 mm, and a sealing temperature of 160±2° C. Next, the samples were left for 2 hours or longer at ordinary temperature, after which the primary seal portion of each sample was measured using a Tensilon RTM-100 tensile tester available from Orientec Co., Ltd. under the following conditions at ambient temperatures of 23° C. and 90° C. five times each, and an average value of the five measurements was used as the seal strength of the primary seal portion.

Distance between chucks: 20 mm
Chuck speed: 300 mm/min
Sample width: 15 mm
Ambient humidity: 50% RH From the obtained results, the seal strength of the primary seal portion at the respective temperatures was evaluated based on the following criteria. The results are shown in Table 1. Note that the following "o" means a favorable result, and "x" means an unfavorable result.

◯: Seal strength of the primary seal portion at 23° C. was 25 N/15 mm or greater.

x: Seal strength of the primary seal portion at 23° C. was less than 25 N/15 mm.

○: Seal strength of the primary seal portion at 90° C. was 1.8 N/15 mm or greater.

x: Seal strength of the primary seal portion at 90° C. was less than 1.8 N/15 mm.

Interlayer Adhesive Strength

The Tensilon RTM-100 tensile tester available from Orientec Co., Ltd. was used to measure the interlayer adhesive strength at 23° C. between the adhesive layer adjacent to the outer side of the inner surface layer; and the layer adjacent to the outer side of the adhesive layer of the prepared heat-shrinkable multilayer films. For example, in the case of Example 1, the interlayer adhesive strength between the adhesive layer Mod-PE adjacent to the outer side of the inner surface layer EVA; and the intermediate layer Ny adjacent to the outer side of the adhesive layer Mod-PE was measured. More specifically, a sample having a width of 15 mm and a length of 100 mm was cut out from the heat-shrinkable multilayer film, 85 mm from one end in the length direction of the sample was left. The adhesive layer adjacent to the outer side of the inner surface layer; and a layer adjacent to the outer side of the adhesive layer were delaminated up to 15 mm from the other end, and a test piece having a "chuck allowance" with a length of 15 mm at the other end was prepared. Next, the "chuck allowance" of the test piece was fixed in the tensile tester, the remaining 85 mm of the test piece was delaminated at a tensile test speed of 200 mm/min, the strength necessary for delamination was measured five times, and the average value of the five measurements was determined as the interlayer adhesive strength. The results are shown in Table 1. Note that with regard to samples for which the interlayer adhesive strength between the adhesive layer adjacent to the outer side of the inner surface layer; and the layer adjacent to the outer side of the adhesive layer was 4 N/15 mm or greater, the inner surface layer tore before the adhesive layer and the layer adjacent to the outer side of the adhesive layer delaminated. In such a case, the samples were described as having experienced "base material tearing".

Self-Weldability

A bottom seal bag measuring 250 mm (width)×600 mm (length) was prepared by heat sealing, in a direction perpendicular to the flow direction, a tubular heat-shrinkable multilayer film that is adjusted so as to have a folded width of 250 mm. Next, the bag was filled with raw meat (approximately 2500 g) with a width of approximately 150 mm and a length of approximately 200 mm and subjected to vacuum packaging using a vacuum packaging machine (Multivac AGW), and a vacuum package was obtained.

The obtained vacuum package was immersed for approximately 3 seconds in 80° C. hot water and heat shrunk, then immediately cooled with cold water, and a sample for evaluating self-weldability was obtained.

The obtained sample was left for one day or longer (for humidity adjustment), after which the adhesive strength of the inner surface layer itself at an ear of the sample was measured five times using a Tensilon RTM-100 tensile tester available from Orientec Co., Ltd. under the following conditions, and an average value of the five measurements was used as the adhesive strength (self-weldability) of the inner surface layer itself.

Distance between chucks: 20 mm
Chuck speed: 300 mm/min
Sample width: 15 mm
Ambient temperature: 23° C.
Ambient humidity: 50% RH From the results of the adhesive strength of the inner surface layer itself, the self-weldability was evaluated based on the following criteria. The results are shown in Table 1.

○: Adhesive strength of the inner surface layer itself is 1 N/15 mm or greater.

x: Adhesive strength of the inner surface layer itself is less than 1 N/15 mm.

Thermal Shrinkage Rate

The thermal shrinkage ratio of the heat-shrinkable multilayer film was measured by the following method.

A heat-shrinkable multilayer film cut to 100 mm (machine direction: MD)×100 mm (transverse direction: TD) was immersed for 10 seconds in 80° C. hot water and then removed and cooled in water at ordinary temperature.

The MD length and the TD length of the heat-shrinkable multilayer film after being immersed and cooled were measured with a ruler, and then the MD shrinkage rate and the TD shrinkage rate were respectively determined using the MD length and TD length after immersion, the MD length and TD length before immersion, and the equation of shrinkage rate (%)=(100−length after immersion)/100×100. The results are shown in Table 1.

TABLE 1

| | Layer Configuration | 5° C. Drop Ball Strength No. of Torn Bags/ No. of Tests | Seal Strength (N/15 mm) of Primary Seal Portion | | Interlayer Adhesive Strength (N/15 mm) | Self-Weldability | Thermal Shrinkage Rate (%) |
|---|---|---|---|---|---|---|---|
| | | | 23° C. | 90° C. | | | |
| Example 1 | PET$^2$/Mod-PE$^{1.5}$/Ny$^7$/EVOH$^4$/Ny$^7$/Mod-PE$^{1.5}$/EVA$^{17}$ | 0/10 | 31.0 (○) | 2.1 (○) | Base material tearing | ○ | 33/34 |
| Example 2 | PET$^2$/Mod-EVA$^{1.5}$/Ny$^7$/EVOH$^4$/Ny$^7$/Mod-EVA$^{1.5}$/EVA$^{17}$ | 0/10 | 27.6 (○) | 2.0 (○) | Base material tearing | ○ | 32/34 |
| Example 3 | PET$^2$/Mod-EVA$^{1.5}$/Ny$^{12}$/EVOH$^4$/Ny$^{12}$/Mod-EVA$^{1.5}$/EVA$^{17}$ | 0/10 | 54.5 (○) | 4.1 (○) | Base material tearing | ○ | 32/35 |
| Example 4 | PET$^2$/Mod-PE$^{1.5}$/EVOH$^4$/Ny$^{14}$/Mod-PE$^{1.5}$/EVA$^{17}$ | 0/10 | 30.5 (○) | 2.1 (○) | Base material tearing | ○ | 31/35 |
| Comparative Example 1 | PET$^2$/Mod-PE$^{1.5}$/Ny$^{14}$/EVOH$^4$/Mod-PE$^{1.5}$/EVA$^{17}$ | 0/10 | 21.2 (x) | 1.6 (x) | 0.8 | ○ | 29/34 |
| Comparative Example 2 | PET$^2$/Mod-EVA$^{1.5}$/Ny$^{14}$/EVOH$^4$/Mod-EVA$^{1.5}$/EVA$^{17}$ | 0/10 | 16.3 (x) | 1.5 (x) | 0.4 | ○ | 30/34 |
| Comparative Example 3 | PET$^2$/EVA + tackifier (10 wt. %)$^{1.5}$/Ny$^7$/EVOH$^4$/Ny$^7$/EVA + tackifier (10 wt. %)$^{1.5}$/EVA$^{17}$ | — | Delamination occurred during stretching, and a film could not be formed. | | | — | — |

TABLE 1-continued

|  | Layer Configuration | 5° C. Drop Ball Strength No. of Torn Bags/ No. of Tests | Seal Strength (N/15 mm) of Primary Seal Portion 23° C. | Seal Strength (N/15 mm) of Primary Seal Portion 90° C. | Interlayer Adhesive Strength (N/15 mm) | Self-Weld-ability | Thermal Shrinkage Rate (%) |
|---|---|---|---|---|---|---|---|
| Comparative Example 4 | PET$^2$/EVA + tackifier (30 wt. %)$^{1.5}$/Ny$^7$/EVOH$^4$/Ny$^7$/EVA + tackifier (30 wt. %)$^{1.5}$/EVA$^{17}$ | — | Delamination occurred during stretching, and a film could not be formed. | | | — | — |
| Comparative Example 5 | PET$^2$/Mod-PE$^{1.5}$/Ny$^7$/EVOH$^4$/Ny$^7$/Mod-PE$^{1.5}$/VLDPE$^{17}$ | 0/10 | 49.6 (o) | 3.7 (o) | Base material tearing | x | 26/29 |
| Comparative Example 6 | PET$^2$/Mod-PE$^{1.5}$/Ny$^7$/EVOH$^4$/Mod-PE$^{1.5}$/VLDPE$^{17}$ | 0/10 | 33.9 (o) | 2.9 (o) | Base material tearing | x | 25/28 |
| Comparative Example 7 | PET$^2$/Mod-PE$^{1.5}$/Ny$^{14}$/EVOH$^4$/Mod-PE$^{1.5}$/Ionomer$^{17}$ | 5/10 | 21.0 (x) | 1.7 (x) | 1.7 | o | 33/35 |

Here, the numbers described at the upper right of the resins contained in each layer of the layer configuration of Table 1 indicate the thickness of each layer.

As is clear from Table 1, Examples 1 to 4, which are provided with an intermediate layer containing Ny, have higher primary seal strengths and higher interlayer adhesive strengths compared to Comparative Examples 1, 2 and 7, which are not provided with an intermediate layer containing Ny.

Moreover, Examples 1 to 4, which contain EVA in the inner surface layer, and for which the inner surface layer, the adhesive layer containing Mod-PE or Mod-EVA, and the intermediate layer containing Ny were laminated in this order from the inner side to the outer side, exhibited a higher thermal shrinkage rate than Comparative Examples 5 to 7, which contain VLDPE or IO in the inner surface layer.

INDUSTRIAL APPLICABILITY

The present invention can be used as a film for a vacuum packaging material for edible meat or the like.

The invention claimed is:

1. A heat-shrinkable multilayer film, comprising:
   an inner surface layer;
   an adhesive layer;
   an intermediate layer adjacent to the adhesive layer;
   an internal layer between the inner surface layer and the adhesive layer and adjacent to both the inner surface layer and the adhesive layer;
   an outermost layer configuring an outer surface; and
   a barrier layer adjacent to an outer side of the intermediate layer,
   the heat-shrinkable multilayer film being obtained by laminating the inner surface layer, the internal layer, the adhesive layer, the intermediate layer, the barrier layer, and the outermost layer in this order from an inner side to an outer side of the heat-shrinkable multilayer film such that the outermost layer is adjacent to the intermediate layer on the outer side of the heat-shrinkable multilayer film, wherein
   the inner surface layer composed of an ethylene-vinyl acetate copolymer having a content of a vinyl acetate monomer unit of from 12 wt % to 20 wt %,
   the adhesive layer comprises an acid-modified ethylene-based copolymer, wherein the acid-modified ethylene-based copolymer consists of a maleic anhydride-modified ethylene-α-olefin copolymer, the weight of the acid that is used in modification is from 0.01 wt % to 15 wt % with respect to the total weight of the modified ethylene-based copolymer that is ultimately obtained,
   the intermediate layer comprises a polyamide-based resin, the polyamide-based resin comprises at least one selected from the group consisting of nylon 6-66 and nylon 6I-6T, wherein a content of the nylon 6-66 in the polyamide-based resin is from 70 wt % to 90 wt % and a content of the nylon 6I-6T in the polyamide-based resin is from 10 wt % to 30 wt %,
   the internal layer comprises ionomers,
   the outermost layer comprises a polyethylene terephthalate-isophthalate copolymer,
   the barrier layer comprising at least one selected from the group consisting of ethylene-vinyl alcohol copolymers and polymetaxylylene adipamide,
   a thickness of the intermediate layer with respect to a total film thickness of the heat-shrinkable multilayer film is greater than 15% and not more than 50%, and
   the heat-shrinkable multilayer film has, at 80° C., a thermal shrinkage rate of from 32% to 40% both in a machine direction (MD) and a transverse direction (TD) of the heat-shrinkable multilayer film.

2. The heat-shrinkable multilayer film according to claim 1, further comprising an outer layer adjacent to an outer side of the barrier layer, the outer layer comprising a polyimide-based resin.

3. The heat-shrinkable multilayer film according to claim 2, wherein the polyamide-based resin contained in the outer layer comprises at least one of an aliphatic polyamide or an amorphous aromatic polyimide.

4. The heat-shrinkable multilayer film according to claim 2, wherein the polyamide-based resin contained in the outer layer comprises at least one selected from the group consisting of nylon 6, nylon 6-66, nylon 6-12, nylon 6-10, and nylon 6-66-12.

* * * * *